US012694995B2

(12) United States Patent
Besmann et al.

(10) Patent No.: US 12,694,995 B2
(45) Date of Patent: Jul. 28, 2026

(54) COMPOSITE URANIUM SILICIDE-URANIUM DIOXIDE NUCLEAR FUEL

(71) Applicant: University of South Carolina, Columbia, SC (US)

(72) Inventors: Theodore M. Besmann, Oak Ridge, TN (US); Emily E. Moore, Livermore, CA (US)

(73) Assignee: University of South Carolina, Columbia, SC (US)

( * ) Notice: Subject to any disclaimer, the term of this patent is extended or adjusted under 35 U.S.C. 154(b) by 462 days.

(21) Appl. No.: 17/174,618

(22) Filed: Feb. 12, 2021

(65) Prior Publication Data

US 2021/0319919 A1     Oct. 14, 2021

Related U.S. Application Data

(60) Provisional application No. 63/009,541, filed on Apr. 14, 2020.

(51) Int. Cl.
G21C 3/62 (2006.01)
C04B 35/515 (2006.01)
C01B 33/06 (2006.01)

(52) U.S. Cl.
CPC .......... G21C 3/623 (2013.01); C04B 35/5158 (2013.01); G21C 3/62 (2013.01); C01B 33/06 (2013.01); C01P 2004/61 (2013.01); C04B 2235/3224 (2013.01); C04B 2235/3891 (2013.01); C04B 2235/5436 (2013.01)

(58) Field of Classification Search
CPC ..................................................... G21C 3/623
See application file for complete search history.

(56) References Cited

U.S. PATENT DOCUMENTS 3,051,566 A * 8/1962 Schwartz ................ C04B 33/13
                                                      419/36
4,199,404 A * 4/1980 Mordarski ............... G21C 3/62
                                                      976/DIG. 96

(Continued)

FOREIGN PATENT DOCUMENTS

EP        3364418 A1 * 8/2018 ............. G21C 21/02
KR    102136758 B1 * 7/2020

OTHER PUBLICATIONS

Harp, Jason M., Paul A. Lessing, and Rita E. Hoggan. "Uranium silicide pellet fabrication by powder metallurgy for accident tolerant fuel evaluation and irradiation." Journal of Nuclear Materials 466 (2015): 728-738. (Year: 2015).*

(Continued)

*Primary Examiner* — Lily C Garner
(74) *Attorney, Agent, or Firm* — Douglas L. Lineberry

(57) ABSTRACT

Described herein are Uranium silicide materials as advanced nuclear fuel replacements for uranium dioxide fuel in light water reactors (LWRs) that have advantages over currently used uranium dioxide ($UO_2$) via a substantially higher thermal conductivity and, thus, are capable of operating in a reactor at significantly lower temperatures for the same level of power production, plus the heat capacity of a silicide is lower than that of an oxide so that less heat is stored in the fuel that would need to be removed under accident conditions.

8 Claims, 4 Drawing Sheets

(56) References Cited

U.S. PATENT DOCUMENTS

| | | | | |
|---|---|---|---|---|
| 4,997,596 | A * | 3/1991 | Proebstle | C04B 35/51 |
| | | | | 376/901 |
| 5,180,527 | A * | 1/1993 | Hirai | G21C 3/62 |
| | | | | 376/901 |
| 9,754,687 | B2 * | 9/2017 | Yacout | C23C 16/45529 |
| 10,457,558 | B2 * | 10/2019 | Lahoda | C01B 32/928 |
| 10,790,065 | B2 * | 9/2020 | Subhash | G21C 21/02 |
| 10,803,999 | B2 * | 10/2020 | Lahoda | G21C 3/20 |
| 11,488,730 | B2 * | 11/2022 | Lahoda | G21C 3/62 |
| 2015/0221398 | A1 * | 8/2015 | Subhash | G21C 3/62 |
| | | | | 264/0.5 |
| 2016/0232993 | A1 * | 8/2016 | Kurina | G21C 3/58 |
| 2017/0213604 | A1 * | 7/2017 | Pegna | C04B 35/565 |
| 2018/0268946 | A1 * | 9/2018 | Lahoda | C01B 33/06 |

OTHER PUBLICATIONS

Wilson, Tashiema L., et al. "Uranium nitride-silicide advanced nuclear fuel: higher efficiency and greater safety." Advances in Applied Ceramics 117.1_suppl (2018): 76-81. (Year: 2018).*

Johnson, Kyle D., et al. "Fabrication and microstructural analysis of UN-U3Si2 composites for accident tolerant fuel applications." Journal of Nuclear Materials 477 (2016): 18-23. (Year: 2016).*

Kobayashi, Kazuma, et al. "Digital Twin for Multi-criteria Decision-Making Framework to Accelerate Fuel Qualification for Accident-Tolerant Fuel Concepts." Handbook of Smart Energy Systems. Cham: Springer International Publishing, 2022. 1-22. (Year: 2022).*

Gong, Bowen, et al. "U3Si2 and UO2 composites densified by spark plasma sintering for accident-tolerant fuels." Journal of Nuclear Materials 534 (2020): 152147. (Year: 2020).*

McClellan, K., et al. Excerpt Attached. "ATF-1 UN-U3Si5 composite fuel development and irradiation test design." FY Ceramic Fuels Development Annual Highlights (2014). (Year: 2014).*

* cited by examiner

COMPOSITE URANIUM SILICIDE-URANIUM DIOXIDE NUCLEAR FUEL

STATEMENT REGARDING FEDERALLY SPONSORED RESEARCH

This disclosure was made with government support under DE-NE0008570 awarded by the U.S. Department of Energy. The government may have certain rights in the disclosure.

TECHNICAL FIELD

The subject matter disclosed herein is generally directed to uranium silicide materials as advanced nuclear fuel replacements for uranium dioxide fuel in light water reactors (LWRs).

BACKGROUND

The advantages (high thermal conductivity, very high melting point, and high density) of nitride fuel have long been recognized. The sodium cooled BR-10 reactor in Russia operated for 18 years on uranium nitride fuel (UN was used as the driver fuel for two core loads). However, the potential advantages (large power up-grade, increased cycle lengths, possible high burn-ups) as a Light Water Reactor (LWR) fuel are offset by uranium nitride's extremely low oxidation resistance (UN powders oxidize in air and UN pellets decompose in hot water). Innovative research is proposed to solve this problem and thereby provide an accident tolerant LWR fuel that would resist water leaks and high temperature steam oxidation/spalling during an accident.

Improving the economics of electricity production is a common driver for research across the different generations of nuclear reactors. In this context, higher burnup of the fuel has obvious advantages: fuel is used for longer and therefore less refueling is required, reducing the volume of spent fuel. Moreover, at high burn-up an increasing fraction of fissions is generated from 239Pu though the neutron-capture of 238U, thus leading to a more efficient use of the uranium resources. Indeed, the average fuel burn-up in pressurized water reactors (PWRs) has changed from about 33 MWd per kgHM (megawatt days per kg of heavy metal) in the 1980s to about 50 MWd per kgHM at present.

One needs to identify, design and produce materials that can withstand the extreme conditions of radiation, temperature, chemical environment and stress inherent in advanced nuclear systems. This requires one first to understand and develop predictive models of their failure mechanisms so that one can develop design codes and defect-assessment criteria that ensure structural integrity. Secondly, one needs to develop manufacturing methods and joining methods to construct the complex geometries that make up both the reactor systems and their associated heat exchangers and generators. It is not unknown in the nuclear industry for new failure modes to be discovered only when a component or structure has entered service, because full-scale testing under reactor operation conditions for design lifetimes is simply not feasible. To combat this, the industry is very conservative with present design codes (ASME 2001), currently only including a relatively small number of materials, which are well characterized under present reactor conditions and were developed during the last half of the twentieth century.

There is also a third crucial issue: one must identify appropriate waste-package materials and their compatibility with an associated repository as part of the initial design process, not as an afterthought. Indeed, unless a route for decommissioning and final disposal is demonstrated for both existing as well as future reactor materials, especially fuel, it may not be possible to gain the necessary public support for new building projects.

It is clear that the requirement for significantly higher radiation tolerance challenges currently certified materials, given doses of 200 d.p.a. (displacements per atom), temperatures of up to 1,000° C. and difficult environments involving contact with high-temperature helium, liquid metal or salt environments. In the past 10 to 20 years, a number of improved reduced-activation ferritic/martensitic steels have been developed for possible use in fusion. Ultrafine precipitation austenitic steels for potential use in liquid-cooled fast reactors showed significantly improved creep properties and increased radiation resistance over the previous materials. However, few have been tested at the very high fluences required for Gen IV fast-reactor designs (beyond 200 d.p.a) and they have also been subjected to ion rather than neutron irradiation.

Furthermore, conventional thermal-power experience with the non-nuclear grades of these materials have shown that their structural integrity performance can be severely limited if weld microstructures are not closely controlled. Indeed, once the optimal alloys have been developed and identified, a significant major challenge will be the development of adequate joining technology.

More recently, oxide-dispersion strengthened (ODS) steels have been developed, most notably in Japan, that show promisingly little change in microstructure at temperatures up to 700° C. and doses up to 150 d.p.a. These ODS alloys are unlikely to be welded using fusion techniques but the geometry of their most likely use, as fuels cladding, is well suited to the use of solid-state joining techniques such as friction inertia welding and friction stir welding. The construction of heat exchangers and steam plants inevitably requires the construction of complex geometries, which currently can be achieved only by fusion welding, and therefore these structures need to be constructed from optimized conventional alloys such as enhanced P91 or HT-UPS variants.

In the longer term, there will be fewer conventional materials being developed, although one might not expect the nanorevolution to have much to offer for nuclear technology. The radiation fields in particular, but also the accumulation of decay products, should spell the destruction of nanoscale structures. There are, however, examples of interfaces that actually seem to offer enhanced properties considering currently available materials and technology, the challenge of producing Gen IV reactor designs with lifetimes beyond 50 years is daunting. Improved reactor materials and processes are required, appropriate waste and decommissioning procedures must be identified, but even these measures will not be enough. One will also need significant changes in design and maintenance methodologies.

At present, nuclear engineering design is predicated on the assumption that the plant is manufactured essentially defect free and capable of lasting its design lifetime without intervention. In practice, if defects are found or postulated within the design lifetime, an assessment using procedures such as the UK's R5 and R6 must be undertaken to prove the plant is safe. Using present procedures and the expected improvements in materials, one is likely to be able to produce plants that can operate under the extreme conditions presented by Gen IV reactors or can have a lifetime of 50+ years, but probably not both.

The obvious way forward is to construct future nuclear plants in a way that they can be monitored and components can be relatively easily repaired or replaced and disposed of. That is, a damage-tolerant design approach needs to be taken where defects are identified and removed from systems well before they affect the structural integrity of a plant. This may even provide the opportunity to incorporate new materials to replace those that have undergone one of those new failure modes that nuclear materials seem to discover from time to time.

Accordingly, it is an object of the present invention to provide uranium silicide materials as advanced nuclear fuel replacements for uranium dioxide fuel in light water reactors (LWRs).

Citation or identification of any document in this application is not an admission that such a document is available as prior art to the present disclosure.

SUMMARY

The above objectives are accomplished according to the present disclosure by providing a replacement nuclear fuel pellet. The fuel patent may include at least one silicide, uranium dioxide powder, wherein the at least one silicide has higher thermal conductivity than uranium dioxide, and the uranium dioxide powder at least partially surrounds the at least one silicide in a body of the fuel pellet. Further, the at least one silicide may be a uranium silicide. Still, the uranium silicide may comprise $U_3Si_2$. Again, the at least one silicide may be at least one particle sized from 1 $\mu$m to 100 $\mu$m. Further yet, an outer layer of uranium dioxide powder may be provided as the exterior layer of the fuel pellet. Still further, the at least one silicide may be present by at least 51% by volume in the pellet. Again still, size of uranium dioxide powder particles may range from 1 to 100 microns.

In a further embodiment, a method for making a nuclear fuel pellet is proved. The method may include forming a pellet from at least one silicide, uranium dioxide powder, and at least one ceramic binder, forming at least one green body from the above, sintering the at least one green body in a controlled oxygen furnace to form a nuclear fuel pellet, the at least one silicide comprises at least 51% of the volume of the nuclear fuel pellet. Further, the at least one silicide may comprise a uranium silicide. Yet still, the uranium silicide may be $U_3Si_2$. Further again, the at least one silicide may be at least one particle sized from 1 $\mu$m to 100 $\mu$m. Still yet, an outer layer of uranium dioxide powder may be formed as the exterior layer of the fuel pellet. Yet again, the at least one silicide may be present from 52-75% by volume in the pellet. Still again, size of uranium dioxide powder particles may range from 1 to 100 microns.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which.

Figure 1:
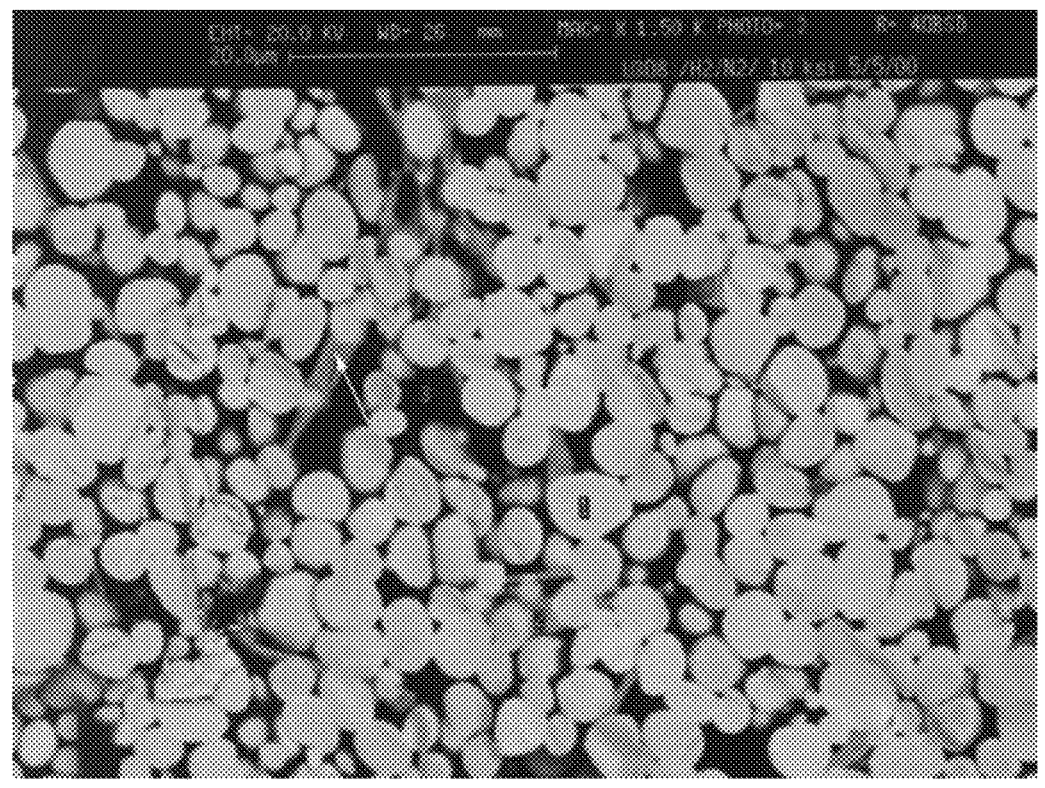
FIG. 1 shows a prior art backscatter SEM micrograph of Liquid-Phase sintered $UO_2$ grains (light colored area) surrounded by corrosion resistant alumino-silicate second phase (dark colored area).

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used interchangeably herein, the terms "sufficient" and "effective," can refer to an amount (e.g. mass, volume, dosage, concentration, and/or time period) needed to achieve one or more desired and/or stated result(s). For example, a therapeutically effective amount refers to an amount needed to achieve one or more therapeutic effects.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

The current disclosure offers Uranium silicide materials as advanced nuclear fuel replacements for uranium dioxide fuel in light water reactors (LWRs). The silicides, a binary compound of silicon with another element or group, such as USi, $U_3Si$, $U_3Si_2$, $U_3Si_5$ and in particular $U_3Si_2$, have advantages over uranium dioxide ($UO_2$) in having a substantially higher thermal conductivity and thus can operate in a reactor at significantly lower temperatures for the same level of power production. Although additional silicon-rich U—Si compounds exist, it was desired to limit investigation in order to retain U-densities above or reasonably near those of $UO_2$. In addition, the heat capacity of a silicide is lower than that of the oxide so that less heat is stored in the fuel that would need to be removed under accident conditions.

Prior work, see FIG. 1, has employed liquid phase sintering wherein a molten second phase wets and spreads on powder surfaces within a compact area. Wetting requires a slight solubility of the powder in the liquid phase. Densification proceeds by particle rearrangement followed by solution-reprecipitation. If there is sufficient liquid phase present, a liquid network is formed that surrounds every grain of UN. This approach has been demonstrated by liquid phase sintering of $UO_2$ using a corrosion-resistant alumino-silicate. The resulting composite structure, see FIG. 1, proved to be extremely resistant to steam oxidation and chemical corrosion whereas pure sintered $UO_2$ swelled and FIG. 1 shows a backscatter SEM micrograph of Liquid-Phase sintered $UO_2$ grains (light colored area) surrounded by corrosion resistant alumino-silicate second phase (dark colored area).

The silicide fuel also offers commercial advantages as in the $U_3Si_2$ form it contains a higher uranium density (uranium atoms/unit volume) than found in $UO_2$ and thus the same energy can be obtained from a smaller volume of fuel in a reactor. A disadvantage of silicide fuel is its significant susceptibility to oxidation in the presence of water, steam, or air that exceeds that of $UO_2$. Thus, a composite silicide-dioxide fuel form is proposed to replace the solely $UO_2$ cylindrical ceramic pellets currently found in LWRs.

Figure 2:
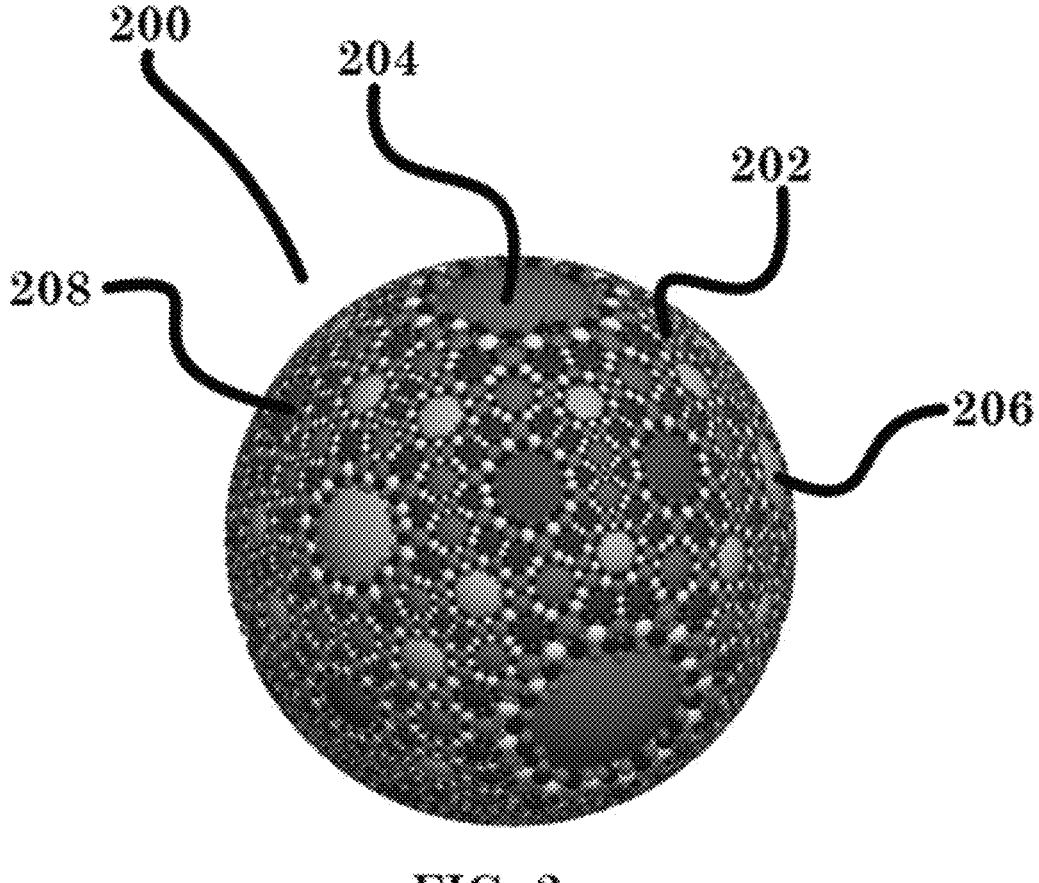
FIG. 2 shows one embodiment of a fuel pellet of the current disclosure with $UO_2$ particles at least partially covered by FIG. 3 shows an interior view of one embodiment of a fuel pellet showing uranium silicide occupies the majority of volume in the fuel pellet while being surrounded by $UO_2$.
Figure 3:
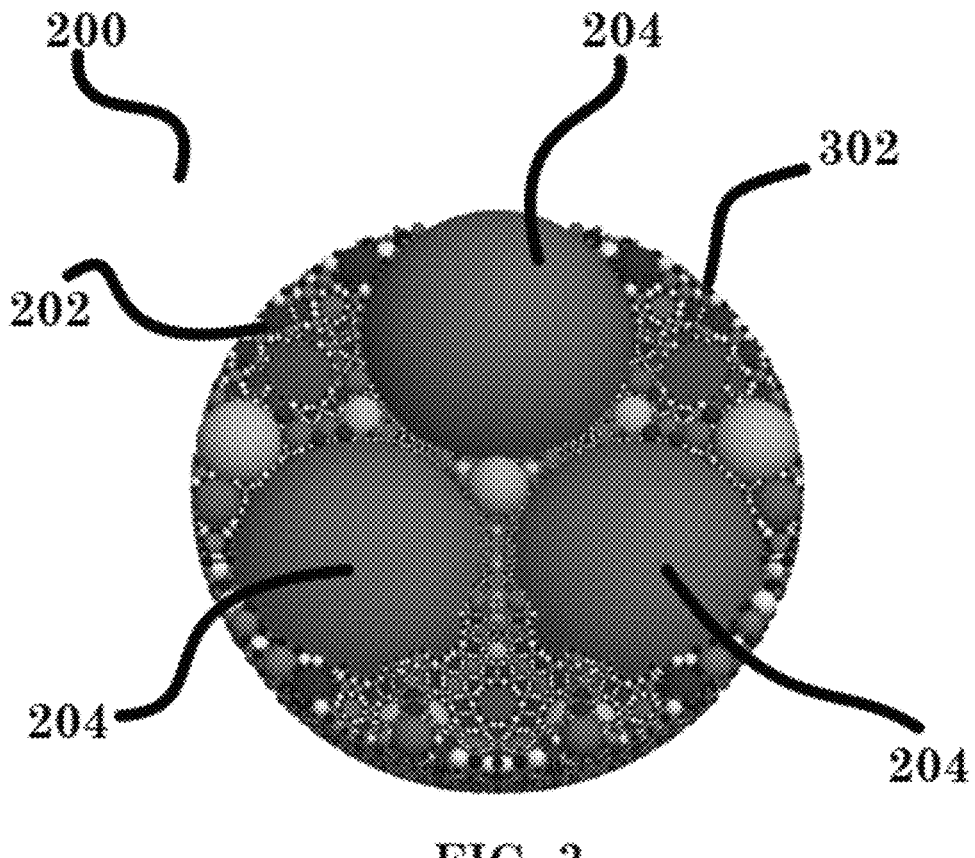
Figure 4:
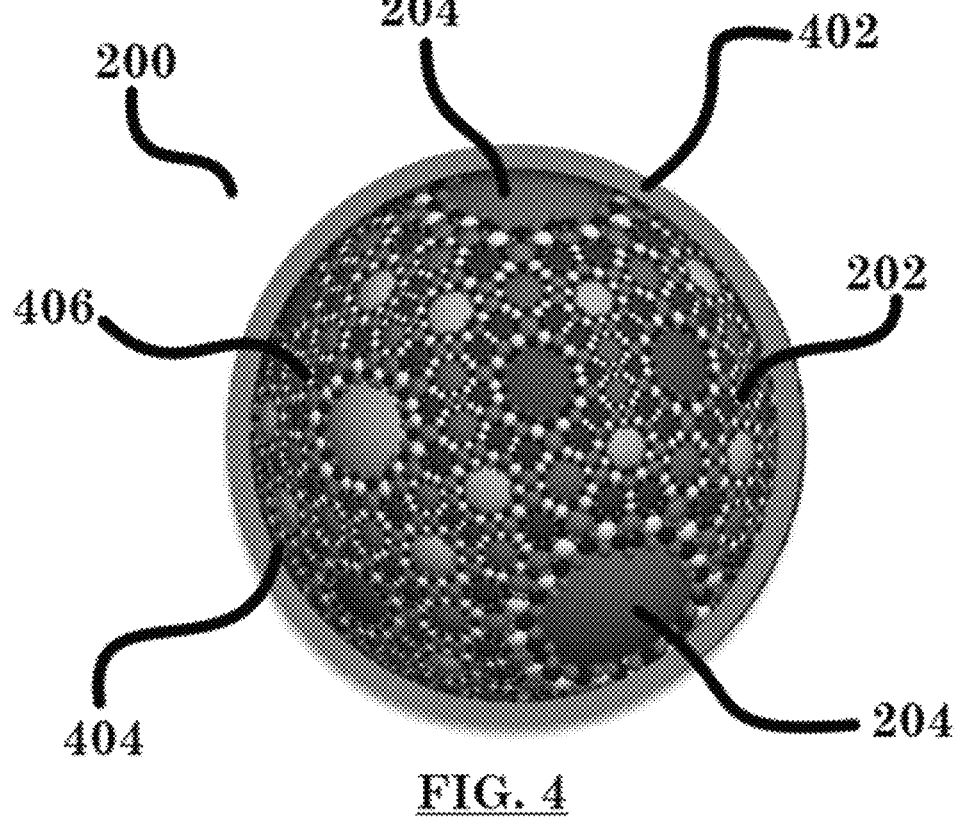
FIG. 4 shows the outer surface of a fuel pellet can be at least partially sealed with a $UO_2$ outer layer.

The composite fuel pellet would have the same oxidation tolerance as $UO_2$, yet largely contain the advantages of $U_3Si_2$. The fuel will consist of multi- to hundred-micrometer particles of $U_3Si_2$, such as from 1 μm to 100 μm, each surrounded by dense, fine-grained $UO_2$ within the pellet providing a silicide grain boundary barrier to water, steam or air/oxygen of the silicide. Fine grained $UO_2$ may range in size from −325 mesh to −100 mesh, from 1 to 100 microns, such as 5 to 95, 10 to 90, 15 to 85, 20 to 80, 25 to 75, 30 to 70, 35 to 65, 40 to 60, 45 to 55, or about 50 microns, including subranges and individual values within these ranges, and/or be submicron (<1 micron). FIG. 2 shows one embodiment of a fuel pellet 200 of the current disclosure with $UO_2$ particles 202 at least partially, if not completely, surrounding uranium silicide 204. Fuel pellet 200 may also include binders 206, such as poly vinyl alcohol, clay, microcrystalline wax, organic and/or ceramic binders, and fillers 208, such as lubricants, burnable absorbers (e.g. gadolinium), pore-formers, niobium, titanium, silicon, aluminum, and chromium, paraffin wax, aluminium stearate, butyl stearate, lithium stearate, magnesium stearate, sodium stearate, stearic acid, zinc stearate, oleic acid, poly glycols, talc, graphite and boron nitride, to secure the materials of the pellet together as well as aid in sintering to form a substantially solid fuel pellet 200. FIG. 3 shows an interior view of fuel pellet 200 showing that uranium silicide 204 occupies the majority of volume of volume 302 of fuel pellet 200 while being surrounded by $UO_2$ 202. As FIG. 4 shows, the outer surface of fuel pellet 200 can optionally be sealed with a $UO_2$ outer layer 402, which may completely enclose outer surface 404 of fuel pellet 200, to further protect fuel pellet interior 406 from water, steam, or air/oxygen and thus ready oxidation of the $U_3Si_2$. Regardless, the $U_3Si_2$ phase would constitute the majority of the volume of the fuel pellet, such as greater than 50%, 51%, 52%, 53%, 54%, 55%, 60%, 65%, 70%, 75%, 80%, 85%, 90%, or 95%, etc., of the pellet total volume, including ranges such as 51-95%, 51-90%, 60-90%, 70-80%, etc. thus providing the physical and chemical advantages of the uranium silicide material in both thermal conductivity and in uranium density.

While preparation of such a composite silicide-dioxide fuel could be accomplished via multiple routes, it is suggested that appropriate coarse particles and fine powders for silicide and dioxide, respectively, be mixed as appropriate using typical ceramic binder additives, as described supra and including admixed binders, for purposes of example only, Zinc stearate, Zinc behenate. Appropriately-sized pellets can thus be cold-pressed to form green bodies and then sintered in a controlled oxygen (low-oxygen) furnace at typical $UO_2$ sintering conditions as known to those of skill in the art. Alternatively, the same powder compositions can be utilized in a spark plasma sintering apparatus that would allow much faster and lower temperature densification of the pellets.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A replacement nuclear fuel pellet comprising:
   an outermost layer of the replacement nuclear fuel pellet formed as a layer of $UO_2$ enclosing at least one silicide comprising $U_3Si_2$;

uranium dioxide powder;

wherein the at least one silicide has higher thermal conductivity than uranium dioxide; and wherein the at least one silicide is formed as multiple separate silicide particles displaced within an interior of the nuclear fuel pellet and the uranium dioxide powder is formed as dense, fine grained powder configured to surround each of the multiple separate silicide particles and fill an intervening space between each of the multiple separate silicide particles within the interior of the nuclear fuel pellet to form a silicide grain boundary barrier configured to prevent water, steam or oxygen from contacting the multiple separate silicide particles wherein the uranium dioxide powder is further configured to fill an interior of the replacement fuel pellet while surrounding the multiple separate silicide particles.

2. The replacement nuclear fuel of claim 1, wherein the multiple separate silicide particles are sized from 1 μm to 100 μm.

3. The replacement fuel of claim 1, wherein the multiple separate silicide particles are present by at least 51% by volume in the fuel pellet.

4. The replacement fuel of claim 1, wherein the size of the at least one particle of uranium dioxide powder ranges from 1 to 100 microns.

5. A method for making a nuclear fuel pellet comprising:

forming an outermost layer of the nuclear fuel pellet as a layer of $UO_2$ configured to enclose:

forming a pellet from:

at least one silicide comprising $U_3Si_2$;

uranium dioxide powder; and at least one ceramic binder;

forming at least one green body from the above;

sintering the at least one green body in a controlled oxygen furnace to form a nuclear fuel pellet;

wherein the at least one silicide comprises at least 51% of the volume of the nuclear fuel pellet; and configuring the at least one silicide as multiple separate silicide particles displaced within an interior of the nuclear fuel pellet completely surrounded by the uranium dioxide powder, which is configured as a dense, fine grained powder configured to form a silicide grain boundary barrier configured to surround each of the multiple separate silicide particles and fill an intervening space between each of the multiple separate silicide particles within the interior of the nuclear fuel pellet to prevent to prevent water, steam or oxygen from contacting the multiple separate silicide particles.

6. The method of claim 5, wherein the multiple separate silicide particles are sized from 1 μm to 100 μm.

7. The method of claim 5, wherein the multiple separate silicide particles are present from 52-75% by volume in the pellet.

8. The method of claim 5, wherein size of uranium dioxide powder particles ranges from I to I 00 microns.

\* \* \* \* \*